(12) United States Patent
Balasubramanian et al.

(10) Patent No.: US 7,406,077 B2
(45) Date of Patent: Jul. 29, 2008

(54) GENERALIZED RATE CONTROL FOR A WIRELESS COMMUNICATIONS NETWORK

(75) Inventors: Srinivasan Balasubramanian, San Diego, CA (US); David Reeves Comstock, San Diego, CA (US); Long L. Duan, San Diego, CA (US); Ralph Gholmieh, San Diego, CA (US); Thawatt Gopal, San Diego, CA (US); Patrick Ahamad Hosein, San Diego, CA (US); Seong-Jun Oh, San Diego, CA (US); Anthony C. K. Soong, Superior, CO (US); Shiau-He Shawn Tsai, San Diego, CA (US); Rath Vannithamby, San Diego, CA (US); Jonas Wiorek, San Diego, CA (US); Hsein Woo, San Diego, CA (US); Tao Wu, Carlsbad, CA (US); Young C. Yoon, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 847 days.

(21) Appl. No.: 10/755,104

(22) Filed: Jan. 9, 2004

(65) Prior Publication Data

US 2004/0179525 A1 Sep. 16, 2004

Related U.S. Application Data

(60) Provisional application No. 60/494,685, filed on Aug. 12, 2003, provisional application No. 60/486,938, filed on Jul. 14, 2003, provisional application No. 60/439,126, filed on Jan. 10, 2003.

(51) Int. Cl.
*H04L 12/28* (2006.01)
*H04J 3/22* (2006.01)

(52) U.S. Cl. .............. 370/391; 370/328; 370/468; 455/452.1

(58) Field of Classification Search .............. 370/252, 370/310, 326, 328, 329, 391, 392, 468, 537–538; 455/63.1, 453, 452.2
See application file for complete search history.

(56) References Cited

U.S. PATENT DOCUMENTS 5,528,593 A   6/1996   Dejaco et al.

(Continued)

FOREIGN PATENT DOCUMENTS

EP   0715431   6/1996

(Continued)

OTHER PUBLICATIONS

Hosein P et al: "On the tradeoff between throughput and fairness on the reverse link of a 3G CDMA network", GLOBECOM '04, IEEE Global Telecommunications Conference (IEEE Cat. No. 04CH37615) IEEE Piscataway, NJ, USA, vol. 6, 2004, pp. 3850-3854 vol. XP002338914.

(Continued)

*Primary Examiner*—Wing F. Chan
*Assistant Examiner*—Saba Tsegaye
(74) *Attorney, Agent, or Firm*—Coats & Bennett, P.L.L.C.

(57) ABSTRACT

An apparatus and method provide MAC logic enabling the use of two or more reverse link rate controls at the same time in one or more sectors of a radio base station. That enables the base station to control reverse link loading via reverse link rate control, while assigning mobile stations to the type of reverse link rate control best suited to their needs. For example, the base station MAC logic may implement both a common rate controller that generates per-sector rate control commands, and a dedicated rate controller that generates per-user rate control commands and assign mobile stations having relatively lax reverse link service needs to the common rate controller, while assigning mobile stations having more demanding reverse link service requirements to the dedicated rate control. More than two rate controls can be implemented, and exemplary choices include per-user, per-sector, per-group, and scheduled rate control in any combination.

25 Claims, 6 Drawing Sheets

U.S. PATENT DOCUMENTS

| | | | |
|---|---|---|---|
| 6,134,220 A | 10/2000 | Le Strat et al. | |
| 6,477,502 B1 | 11/2002 | Ananthpadmanabhan et al. | |
| 6,741,862 B2 * | 5/2004 | Chung et al. | 455/452.1 |
| 6,798,774 B1 * | 9/2004 | O'Connor | 370/391 |
| 7,221,653 B2 * | 5/2007 | Vanghi | 370/252 |
| 2002/0141349 A1 * | 10/2002 | Kim et al. | 370/252 |
| 2002/0183066 A1 * | 12/2002 | Pankaj | 455/453 |
| 2003/0078010 A1 | 4/2003 | Davis | |
| 2004/0252669 A1 | 12/2004 | Hosein | |

FOREIGN PATENT DOCUMENTS

| | | |
|---|---|---|
| EP | 123807 | 8/2002 |
| EP | 1 246 384 | 10/2002 |
| WO | WO02/35735 | 5/2002 |
| WO | WO 2004/045239 | 5/2004 |

OTHER PUBLICATIONS

Harri Holma and Antti Toskala: "WCDMA for UMTS," John Wiley & Sons, Ltd. 2000 XP002278973, p. 123-127.

* cited by examiner

GENERALIZED RATE CONTROL FOR A WIRELESS COMMUNICATIONS NETWORK

RELATED APPLICATIONS

This application claims priority under 35 U.S.C. § 119(e) from the following provisional applications: Application Ser. No. 60/439,126 filed on 10 Jan. 2003, Application Ser. No. 60/486,938 filed on 14 Jul. 2003, and Application Ser. No. 60/494,685 filed on 12 Aug. 2003. These applications are incorporated in their entirety by reference herein.

BACKGROUND OF THE INVENTION

Evolving wireless standards, such as the forthcoming Release D of the IS-2000 standards for cdma2000 wireless networks, contemplate the use of increasingly sophisticated network entities to enhance performance and reliability while offering increasingly high data rates over a range of wireless applications and corresponding qualities of service. For example, it is expected that base stations, e.g., base station systems (BSSs), radio base stations (RBSs), etc., will be required to support a mix of voice and data users, and to support a wide range of forward and reverse link packet data rates and quality-of-service (QoS) requirements, all while maintaining efficient use of the limited forward and reverse link resources.

SUMMARY OF THE INVENTION

The present invention comprises an apparatus and methods for providing different rate control mechanisms to different mobile stations in a wireless communication network. In one exemplary embodiment, a radio base station includes a generalized medium access control (MAC) structure that provides two or more rate controllers. For example, the MAC may provide a per-sector rate controller that generates common rate control commands based on overall sector reverse link loading, while simultaneously providing a per-user rate controller that generates dedicated rate control commands for individual mobile stations. Associated control logic can assign one or more of the mobile stations to the per-sector rate controller, while assigning one or more of them to the per-user rate controller. Broadly, such mixed rate control can be based any combination of per-user rate control, per-sector rate control, per-group rate control, and per-user (or group) scheduled rate control. Further, given mobile stations can be assigned to fundamental and supplemental rate controls, such that the reverse link rate control behavior of a given mobile station is governed or otherwise influenced by two or more rate control mechanisms.

Thus, in an exemplary embodiment, a wireless communication system includes a Radio Base Station (RBS) comprising physical layer resources providing one or more wireless communication channels for communicating with a plurality of mobile stations, and medium access control (MAC) logic to control the allocation of the physical layer resources, wherein the MAC logic comprises two or more reverse link rate controllers, each rate controller configured to provide a different reverse link rate control mechanism for one or more mobile stations being supported by the RBS. The two or more rate controllers comprise two or more of the following group of rate controllers: a per-sector rate controller configured to provide common rate control commands on a per-sector basis, a per-user rate controller configured to provide dedicated rate control commands on a per-mobile basis, a per-group rate controller configured to provide common rate control commands to a group of mobile stations, and a scheduling rate controller configured to provide scheduled reverse link rates to one or more mobile stations.

The MAC logic may include, or otherwise be associated with, exemplary control logic that assigns individual mobile stations to one or more of the MAC logic's available rate controllers. For example, base station control logic may assign given mobile stations to a particular one, or to particular ones, of the available MAC rate controllers at call admission based on one or more service requirements of the mobile station, e.g., based on the application type or types the mobile station is associated with. In this manner, individual mobile stations may be assigned to the rate control mechanism(s) that best complement their particular needs, e.g., required data rates, QoS constraints, etc. Note, too, that the exemplary MAC logic and associated control logic can be configured to dynamically change the rate controller assignments for individual mobile stations responsive to changing mobile station service requirements.

Of course, complementing the above control framework, the mobile stations may be configured to exploit the availability of multiple rate controllers. For example, a given mobile station may be assigned to a per-user rate controller, but additionally may listen to the rate control commands being sent by a per-group or per-sector rate controller. Thus, it may modify how it responds to the per-user rate control commands that it receives based on the per-sector rate control commands. The exemplary mobile station may be configured to respond to other mixes of different types of rate control commands.

Broadly, then, the present invention comprises a method of reverse link control at a wireless communication network base station system based on providing two or more reverse link rate controllers, each rate controller being configured to generate reverse link rate control commands distinct from the commands generated by the other rate controllers, selectively associating individual mobile stations with at least one of the rate controllers, and generating reverse link rate control commands using one or more of the rate controllers and transmitting the commands to associated mobile stations. The rate controllers can be implemented in base station controller logic, in radio base station logic, or in some combination thereof.

Regardless, the exemplary base station system preferably is configured to provide two or more rate controllers for generating distinct reverse link rate control commands for different mobile stations associated with different ones of the rate controllers available in a given radio sector of the base station system. The rate controllers available in a given radio sector may be of different types, e.g., per-user and per-sector, and may operate simultaneously. However, those skilled in the art will recognize that the present invention is not so limited, and will recognize additional variations, features, and advantages upon reading the following description and upon viewing the accompanying figures.

DETAILED DESCRIPTION OF THE INVENTION

Figure 1:
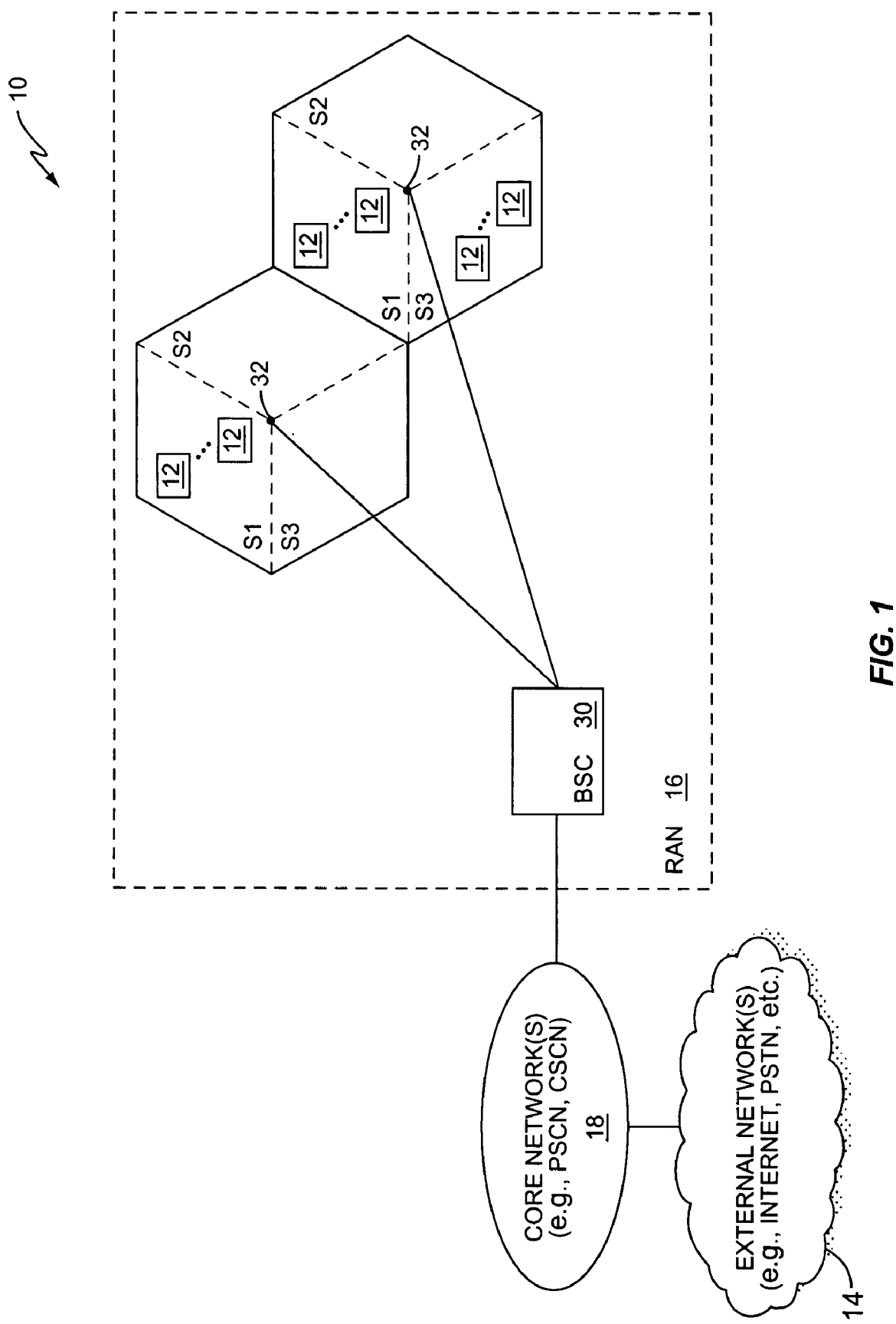
FIG. 1 is a diagram of a wireless communication network in an exemplary embodiment of the present invention.

FIG. 1 is a diagram of an exemplary wireless communication network 10. Network 10 is depicted in simplified form for purposes of discussion but those skilled in the art will appreciate that network 10 may include entities not illustrated, and that the illustrated entities may embody additional complexity. Further, it should be understood that while network 10 comprises a cdma2000 wireless communication network in one or more exemplary embodiments, the present invention is not so limited, and network 10 may be based on other standards, such as Wideband CDMA (WCDMA).

With the above in mind, network 10 communicatively couples mobile stations 12 to one or more external networks 14, such as the Internet or other Public Data Networks (PDNs) and/or the Public Switched Telephone Network (PSTN). In the exemplary, simplified illustration, network 10 comprises a Radio Access Network (RAN) 16 that is communicatively coupled to one or more Core Networks (CNs) 18, that in turn provide communication with the external networks 14. RAN 16 comprises one or more Base Station Systems (BSSs), each comprising a Base Station Controller (BSC) 30 and one or more associated Radio Base Stations (RBSs) 32. Those skilled in the art will appreciate other BSS arrangements are possible, e.g., BSC logic can be wholly or partially shifted to the RBS level, and the present invention contemplates all such variations.

Each RBS 32 provides radio service over one, two, or more sectors—the illustrated RBSs 32 each provide coverage over three sectors, denoted as S1, S2, and S3. The term "sector" as used herein should be given broad construction and thus should be understood as meaning a defined radio coverage area. In an exemplary definition, the term sector denotes the intersection of a given radio carrier with a given radio coverage area. Thus, the illustrated RBSs 32 may use two or more radio carriers to provide overlaid sectors. In any case, such details are not central to understanding the present invention, and those skilled in the art will appreciate that the per-sector rate control described later herein should be broadly understood to represent common rate control as applied to a given radio coverage area.

Figure 2:
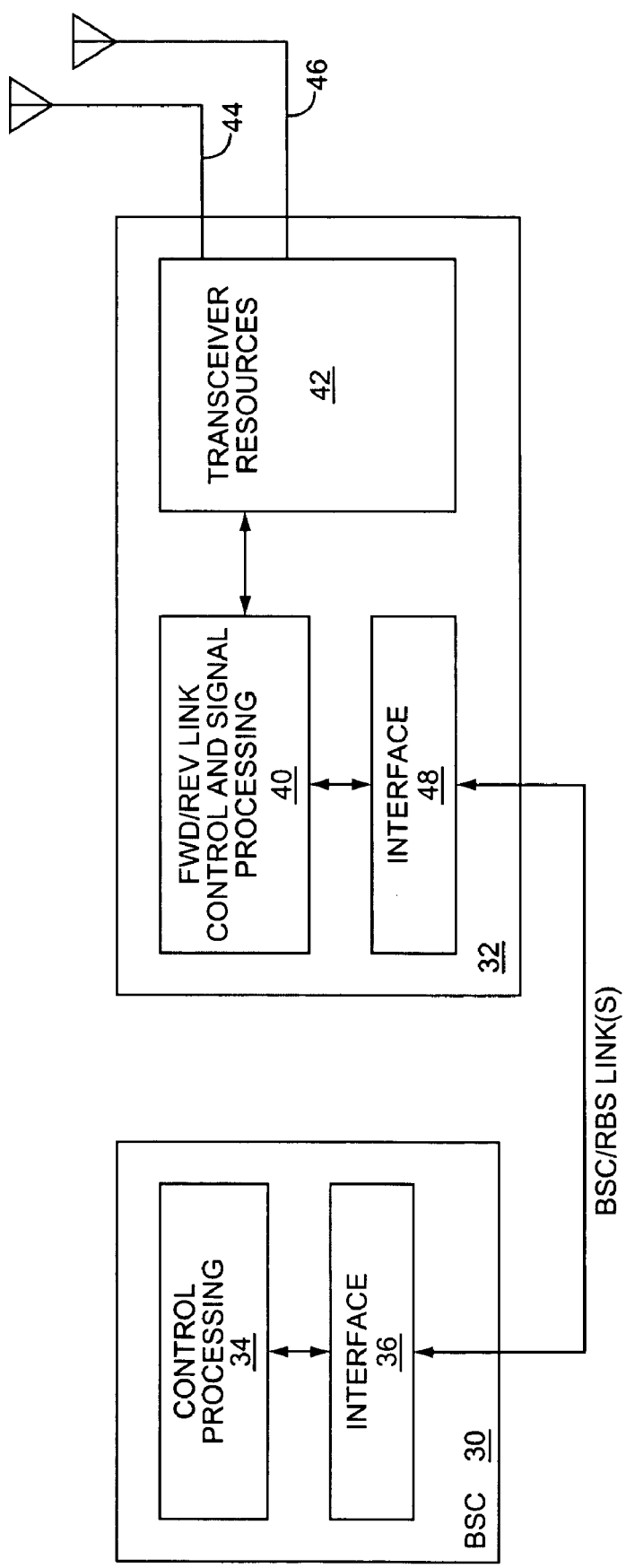
FIG. 2 is a diagram of exemplary base station system details.

FIG. 2 illustrates an exemplary base station system comprising an exemplary BSC 30 and one RBS 32, which are illustrated in terms of simplified function elements to aid clarity. It should be understood that BSC 30 generally is configured to support multiple RBSs 32, and that each RBS 32 can be configured to support more than one radio sector.

In any case, BSC 30 comprises control processing circuits 34, e.g., one or more signal processors, microcontrollers, etc., configured to provide call control logic for setting up, maintaining, and tearing down logical connections associated with voice and/or data calls terminating at and originating from various ones of the mobile stations 12 being supported by RBS 32, and further comprises interface circuits 36 for communicatively coupling to RBS 32, e.g., backhaul interface circuits for E1/T1 lines, microwave, etc. Interface circuits 36 may include additional, possibly different interfaces for communicating with the CNs 18, such as for communicating with a Mobile Switching Center (not illustrated). Further, BSC 30 may include or be associated with a Packet Control Function (PCF), or like entity, providing a Radio-Packet (RP) interface between the packet side of the CNs 18 and the RAN 16.

RBS 32 comprises forward/reverse link control and signal processing circuits, which are referred to herein collectively as processing circuits 40. RBS 32 further comprises transceiver resources 42 and associated receive/transmit antenna elements 44 and 46, respectively, and one or more interface circuits 48 to communicatively couple RBS 32 to BSC 30. Exemplary processing circuits 40 comprise one or more signal processors, e.g., DSP circuits, microprocessors/microcontrollers, or the like, and associated supporting circuits, while the transceiver resources 42 comprise the modulation/demodulation and coding/decoding circuits used to implement the physical layer channels used to communicate with the mobile stations 12 on the forward (transmit) and reverse (receive) links.

In broad terms, the base station system can be configured to implement an exemplary method of reverse link control wherein, in a given radio sector under its control, it functionally provides two or more reverse link rate controllers, each capable of generating reverse link rate control commands distinct from those generated by the others. Thus, one or more first mobile stations in the sector can be commanded by a first one of the rate controllers, while one or more second mobile stations can be commanded by a second one of the available rate controllers.

An exemplary method thus comprises providing two or more reverse link rate controllers, each rate controller configured to generate reverse link rate control commands distinct from the commands generated by the other rate controllers, selectively associating individual mobile stations 12 with at least one of the rate controllers, and generating reverse link rate control commands using one or more of the rate controllers and transmitting the commands to associated mobile stations 12.

In this context, providing two or more rate controllers can comprise providing control logic to implement two or more rate controllers in each radio sector of a radio base station included in the base station system. Such implementation may comprise providing Medium Access Control (MAC) logic in RBS 32, wherein the MAC logic is configured functionally to implement two or more rate controllers in each radio sector of the radio base station. However, it should be understood that such functionality can be implemented elsewhere in RBS 32, e.g., in other network processing layers or sub-layers of RBS 32, or by providing base station control logic in BSC 30, wherein the base station control logic is configured functionally to implement two or more rate controllers in each radio sector of RBS 32.

Further, it should be understood that the term "logic" connotes a functional processing structure configured to carry out desired processing and control operations. Thus, logic as used herein represents hardware, software, or any combination thereof that is configured to carry out one or more defined operations. As such, those skilled in the art will appreciate that the base station control logic and MAC logic discussed in detail later herein may comprise essentially any mix of hardware and software and, as such, may be implemented in various kinds of processing circuits such as microprocessors, etc.

Regardless, selectively associating individual mobile stations 12 with at least one of the rate controllers may comprise determining rate controller associations for individual mobile stations at call admission based on one or more service requirements of the individual mobile stations, and may further comprise dynamically changing the rate controller associations of individual mobile stations 12 after call admission based on changing service requirements of the individual mobile stations. Such dynamic reassignment of individual mobile stations 12 to rate controllers also can be used to control reverse link congestion by dynamically changing the rate controller associations of individual mobile stations 12 after call admission responsive to changing service requirements of the individual mobile stations 12.

Further, selectively associating individual mobile stations with at least one of the rate controllers can comprise associating at least one mobile station with a first one of the rate controllers to act as a fundamental rate controller for the mobile station, and with a second one of the rate controllers to act as a supplemental rate controller for the mobile station, such that reverse link rate control for the mobile station is effected based on a desired combining relationship of the rate control commands transmitted by the fundamental and supplemental rate controllers. Such fundamental and supplemental rate control, which may comprise assigning primary and secondary rate controllers, is explained in greater detail later in this discussion.

Exemplary variations of providing multiple rate controllers also are described in greater detail later herein, but, broadly, an exemplary embodiment of providing two or more reverse link rate controllers comprises, for a given radio sector of the base station system, providing at least two rate controllers selected from the group comprising a per-sector rate controller configured to provide common rate control commands on a sector basis, a per-group rate controller configured to provide common rate control commands on a per-group basis, a per-user rate controller configured to provide dedicated rate control commands on a per-user basis, and a scheduling rate controller configured to generate scheduled reverse link rate control commands for particular users or groups of users.

In more detail, an exemplary per-sector rate controller generates rate control commands for general use by mobile stations 12 in a given sector of RBS 32. Of course, individual mobile stations 12 not associated with a per-sector rate controller may ignore or even be unaware of its commands. Common rate control commands can be generated based on measured or estimated reverse link loading and can be formed as Reverse Activity Bits (RAB) that indicate the level of sector loading, or that otherwise provide some form of discrete command indication such as "UP," "DOWN," or "HOLD." Similarly, as used herein, the term per-group rate controller denotes, in an exemplary embodiment, a rate controller that generates common rate control commands intended for a defined group of mobile stations 12. Thus, two or more per-group rate controllers may be active for the sector, each generating distinct rate control commands for the different mobile station groups.

Further, as used herein, the term per-user rate controller denotes, in an exemplary embodiment, a rate controller that generates dedicated rate control commands for individual users, preferably in the form of discrete command indicators (e.g., UP, DOWN, HOLD) for each user (mobile station 12) associated with the controller. The term scheduling rate controller as used herein denotes, in an exemplary embodiment, a rate controller that also generates per-user rate control commands, but preferably the commands generated by the scheduling controller are "absolute" rate control commands in that they command individual mobile stations 12 to operate at specified reverse link rates at specified times, rather than commanding incremental adjustments as done with the per-user dedicated rate control. Of course, it should be understood that this definitional framework is subject to variation and those skilled in the art will appreciate that the different types of rate control can be configured differently, or have nuances regarding their precise control behavior.

With the above in mind, an exemplary RBS 32 implements functions corresponding to Layers 1 and 2 of the Open System Interconnection (OSI) standard seven-layer network reference model. More particularly, RBS 32 uses transceiver resources 42 to provide the physical layer (Layer 1), which defines the communication channels used to communicate with the mobile stations 12 over the air interface. RBS 32 further provides data layer (Layer 2) functions in the form of a MAC sub-layer and a Link Access Control (LAC) sub-layer. Higher layers, i.e., Layer 3 and above, reside at the BSC level or higher.

Figure 3:
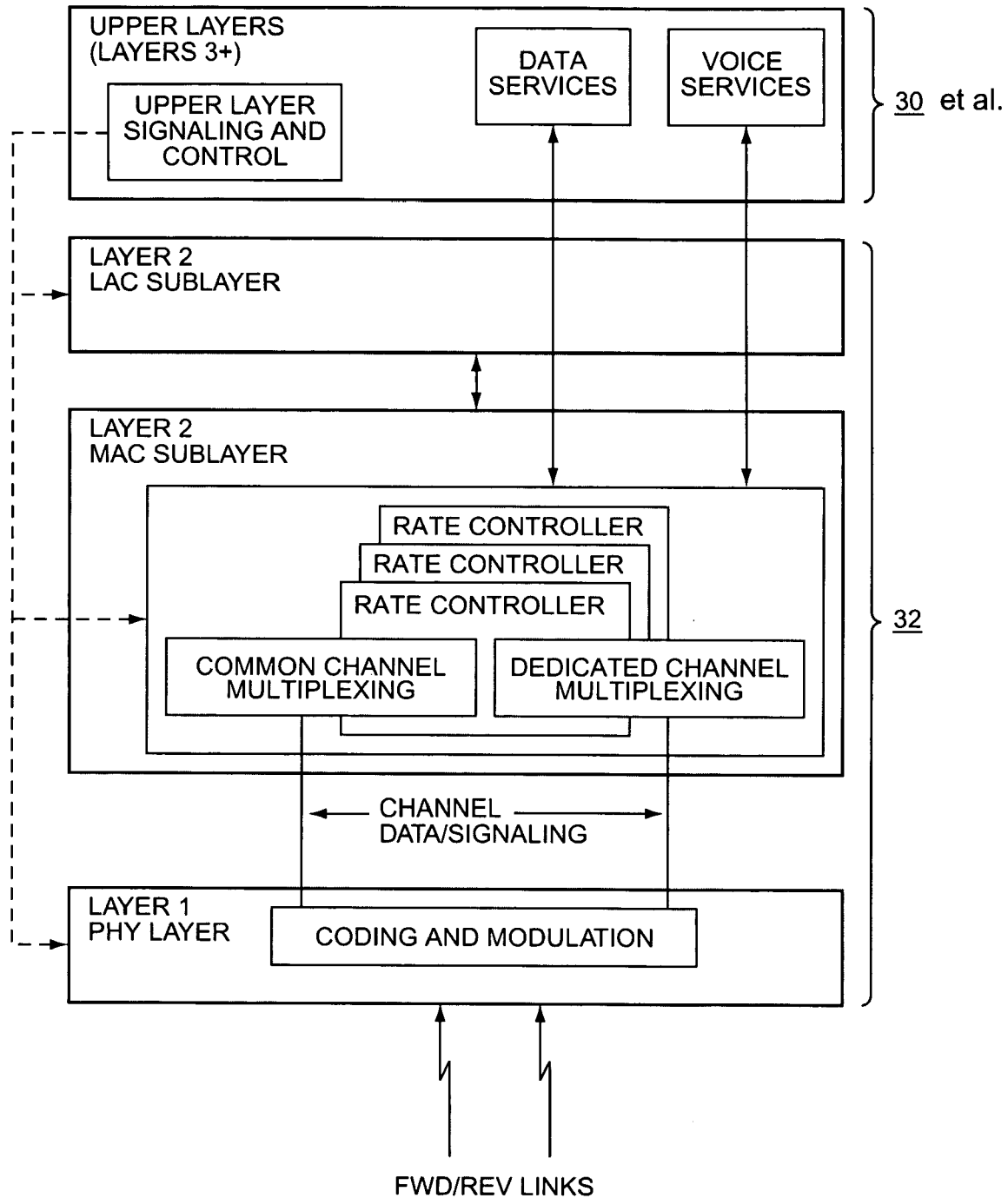
FIG. 3 is a diagram of an exemplary functional arrangement for a generalized medium access control (MAC) according to one or more embodiments of the present invention.

By way of non-limiting example, FIG. 3 illustrates one embodiment of these network layers but it should be understood that a different arrangement of layers and sub-layers could be used without departing from the present invention. As a broad overview, Layer 3, which typically is implemented at BSC 30, provides signaling to control the connections to the individual mobile stations 12, while Layer 2 provides the interface between the "logical" channels used by the higher layers and the physical channels implemented by Layer 1. In particular, the MAC sub-layer of Layer 2 performs scheduling and mapping of the logic channels onto the Layer 1 transport channels. For common transport channels—i.e., channels shared by more than one mobile station 12—the MAC sub-layer may add addressing information to distinguish different data flows for different mobile stations 12.

In more detail, the MAC logic in a cdma2000 implementation provides "control state" procedures for managing the access of physical layer channels by packet data and voice services, for best effort delivery over the air interface via Radio Link Protocol (RLP), and for the aforementioned scheduling and mapping, which includes channel multiplexing and QoS control services. These aspects of MAC logic operation are well understood in the art and understanding the present invention does not require any further elaboration of them. Further, it should be noted that the MAC logic may be varied depending on the network type, e.g., varied for cdma2000, WCDMA, etc.

However, exemplary MAC logic according to the present invention comprises two or more so called "rate controllers" that provide reverse link data rate control commands to mobile stations 12 being supported by the RBS 32. Reverse link rate control generally is known in the art but conventional rate control provides only one control mechanism, i.e., only one rate control algorithm at any given time, which is used to control the reverse link rates of the mobile stations 12. Reverse link rate control provides the base station system (RBS 32 and BSC 30) with a mechanism for controlling base station loading, e.g., reverse link rates can be decreased to decrease base station loading and increased to increase base station loading. Exemplary details regarding base station loading measurement appear in the co-pending and commonly assigned U.S. patent application entitled "METHOD FOR DYNAMICALLY ADJUSTING A TARGET LOAD FOR A REVERSE LINK CHANNEL IN A CDMA NETWORK." That application, which is incorporated in its entirety herein by reference, was filed on 11 Nov. 2003 and is identified by Ser. No. 10/718,145.

Figure 4:
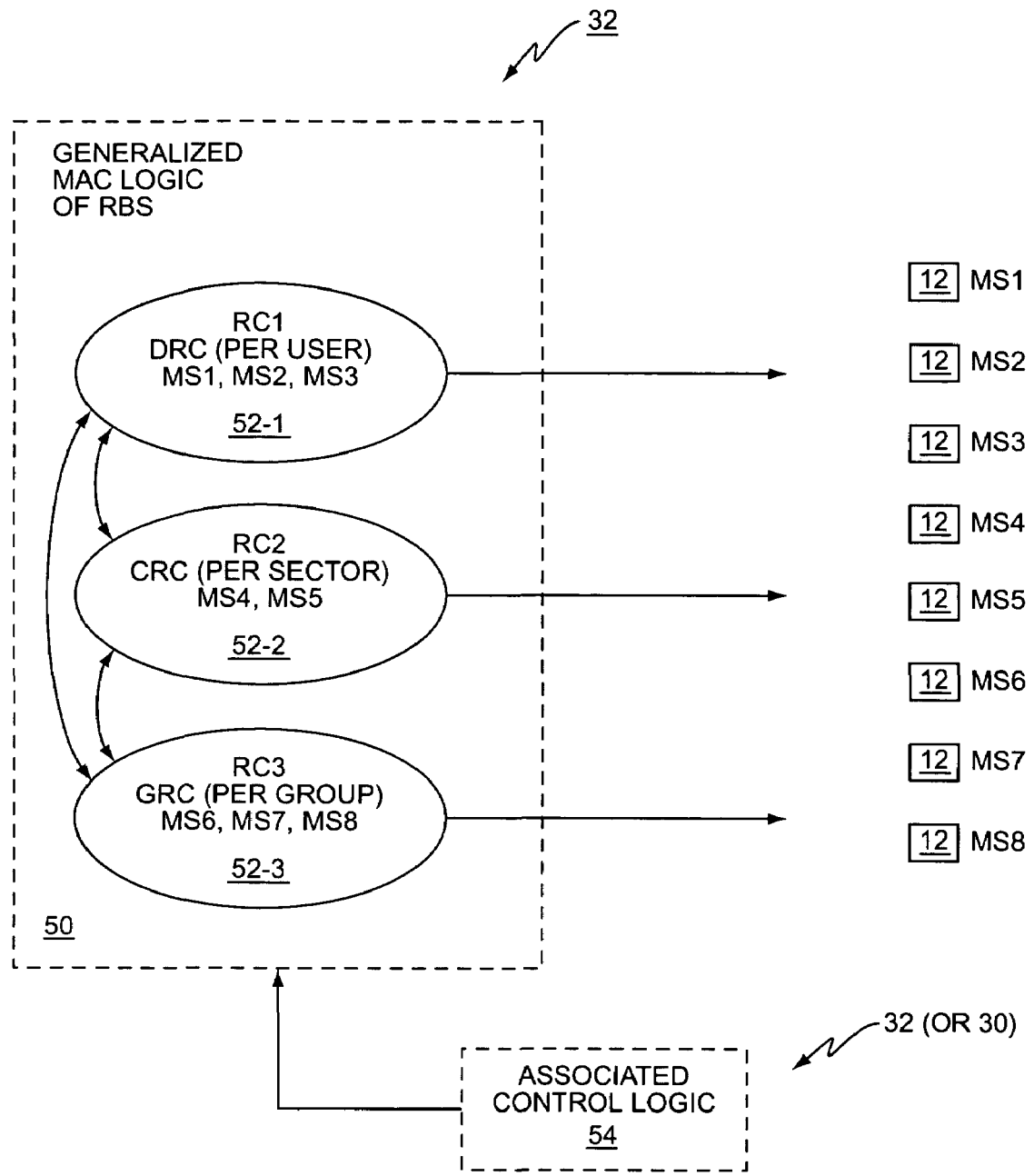
FIG. 4 is a diagram of exemplary network layering models for implementing a multi-controller MAC according to one or more embodiments of the present invention.

According to one or more exemplary embodiments of the present invention, a generalized MAC architecture includes different rate controllers, each generating rate control commands for the mobile stations 12 associated with it that can be distinct from the rate control commands being generated by the other rate controller(s). By way of non-limiting example, FIG. 4 illustrates exemplary MAC logic 50 according to one embodiment of the present invention, wherein the MAC logic 50 includes three rate controllers 52-1 through 52-3 (denoted as RC1, RC2, and RC3). The MAC logic 50 includes or is associated with additional control logic 54, which may be located in RBS 32 or, preferably, in BSC 30, that provides assignment and selection controls that associate given ones of the mobile stations 12 with one or more of the rate controllers 52. It should be understood that 52-1 through 52-3 may represent the rate controllers available in a given sector of RBS 32, and that other sectors of RBS 32 would have two or more rate controllers available in them, and that the rate controllers in one sector do not have to be the same in number or configuration as in the other sectors. Further, it should be understood that one or more of the available rate controllers may be configured to operate across two or more sectors.

On that point, it should be noted that the processing logic implementing the rate controllers 52 can be provided in the MAC logic 50, the control logic 54, or elsewhere within the base station system network architecture. For example, some or all of the control logic 54 can be implemented in BSC 30, and the rate controllers 52 can be implemented as part of that logic, or within other processing logic of BSC 30. Thus, rate control can be implemented at Layer 3, for example. Such BSC implementations may be particularly advantageous in terms of integrating rate controller assignment and reassignment functions with ongoing caller admission and congestion control logic that also may be implemented in BSC 30. BSC-based rate control also may be particularly advantageous where signaling overhead between the RBS 32 and BSC 30 is not problematic.

Therefore, for purposes of this discussion it should be understood by those skilled in the art that implementation of the rate controllers 52 in MAC logic 50 is an exemplary but non-limiting embodiment, and that implementation of the rate controllers 52 elsewhere within the base station system, e.g., at different network layers within RBS 32, or within the logic processing of BSC 30, is contemplated by the present invention. Further, it should be understood that an exemplary "set" of rate controllers 52 can be implemented for each of one or more RBS radio sectors, such that the rate control commands generated by them generally are used by mobile stations 12 in the corresponding radio sector. However, as noted, one or more of the rate controllers 52 can be configured to generate rate control commands for mobile stations 12 in two or more sectors of the RBS 32.

Returning to the illustrated embodiment, MAC logic 50 comprises RC1 configured as a per-user dedicated rate controller that generates per-user rate control commands for each of one or more mobile stations 12 assigned to it. RC2 is configured as a per-sector common rate controller that generates common rate control commands, e.g., RABs, on a per-sector basis. These common rate control commands preferably are generated based on measured or estimated loading of the RBS sector. Such commands (whether per-sector or per-group) may be generated as multi-bit values indicating one of a plurality of loading regions demarcated by one or more reverse link loading thresholds defined at the RBS 32. RC3 is configured as per-group rate controller that generates common rate control commands for a defined subset of mobile stations 12 in the sector. Note that in actual implementation there may be multiple groups or subsets of mobile stations 12 and, effectively, a different group rate controller for each such subset. For example, with different user classes, e.g., Gold, Silver, and Bronze classes, each class effectively could have its own per-group rate controller, wherein the more preferred user classes typically would be commanded to higher group data rates and/or would receive preferential treatment during times of congestion.

Continuing with further examples, network 10 can be configured such that BSC 30 and/or RBS 32 permit the system operator to tailor rate controller assignment logic to the operator's particular needs or desires. Thus, where there are no user classes and no QoS differentiation (i.e., a single class of best effort users), mobile stations 12 may be assigned by default to a rate controller 52 configured to provide per-sector common rate control. With multiple user classes and no QoS differentiation, the assignment logic can be configured to use per-group common rate control, which can be accomplished by generating and sending different per-group rate control commands, or by configuring different mobile stations 12 to respond to the same commands differently depending on their group assignment. In that sense, one per-group rate controller 52 effectively can function as multiple group rate controllers because different mobile stations can be configured to respond differently to its common rate control commands.

With best effort and/or QoS for jitter and throughput, mobile stations 12 may be assigned selectively to common rate control, dedicated rate control, or to some combination thereof. User classes within this context further may be accommodated by using per-group commands. With no user classes but with best effort/QoS considerations, the base station system can be configured such that it uses a mix of per-group common rate control and per-mobile dedicated rate control. In the same context but with multiple user classes, the base station system can be configured to use a mix of per-group common rate control, per-mobile dedicated rate control, scheduling, and, optionally, power boosting/de-boosting. Finally, the base station system can be configured to manage mobile stations 12 with respect only to QoS constraints based on scheduling rate control.

Frame error guarantees can be included in any of the above rate control method variations. For example, power boosting can be used wherein the mobile stations 12 are directed to increase the transmit powers of their first transmission frames to achieve a lower Frame Error Rate (FER).

Of course, as noted elsewhere in this discussion, the assignment and reassignment of mobile stations 12 to particular ones of the rate controllers 52 implemented in the exemplary base station system can be linked closely with the logical processing of admission control and/or congestion control. For example, if per-group common rate control is running, then congestion can be detected by monitoring the reverse link loading as used in the generation of the corresponding RABs. Upon detecting congestion, the base station system— e.g., processing logic 54 or other processor resources—can be configured to disconnect best effort users starting from the lowest user class first (if user classes are defined), and/or to lower throughput guarantees for throughput-intensive users, e.g., for QoS constrained users. Additionally, exemplary congestion detection can trigger admission control processes that block users by class, by resource needs, etc. Note that if only per-user rate control is being used, e.g., a mix of per-user dedicated rate control with its incremental up/down/hold commands being sent per-user and scheduling rate control with its per-user commanded rates, then the scheduling rate controller inherently can be used to perform congestion control because it has full control of the resources allocated to the scheduled users. Such control also can be configured to tie in with or otherwise trigger admission control.

In any case, with the illustrated configuration, MAC logic 50 provides three reverse link rate controllers, each generating distinct and, in this case, different types of reverse link rate control commands. Thus, mobile stations MS1-MS3 are commanded on a per-user basis according to the dedicated rate control commands generated by RC1, while mobile stations MS6-MS8 are commanded on a group basis according to the group rate control commands generated by RC3. The remaining mobile stations, MS4 and MS5, are commanded according to the common, per-sector rate control commands generated by RC2.

Figure 5:
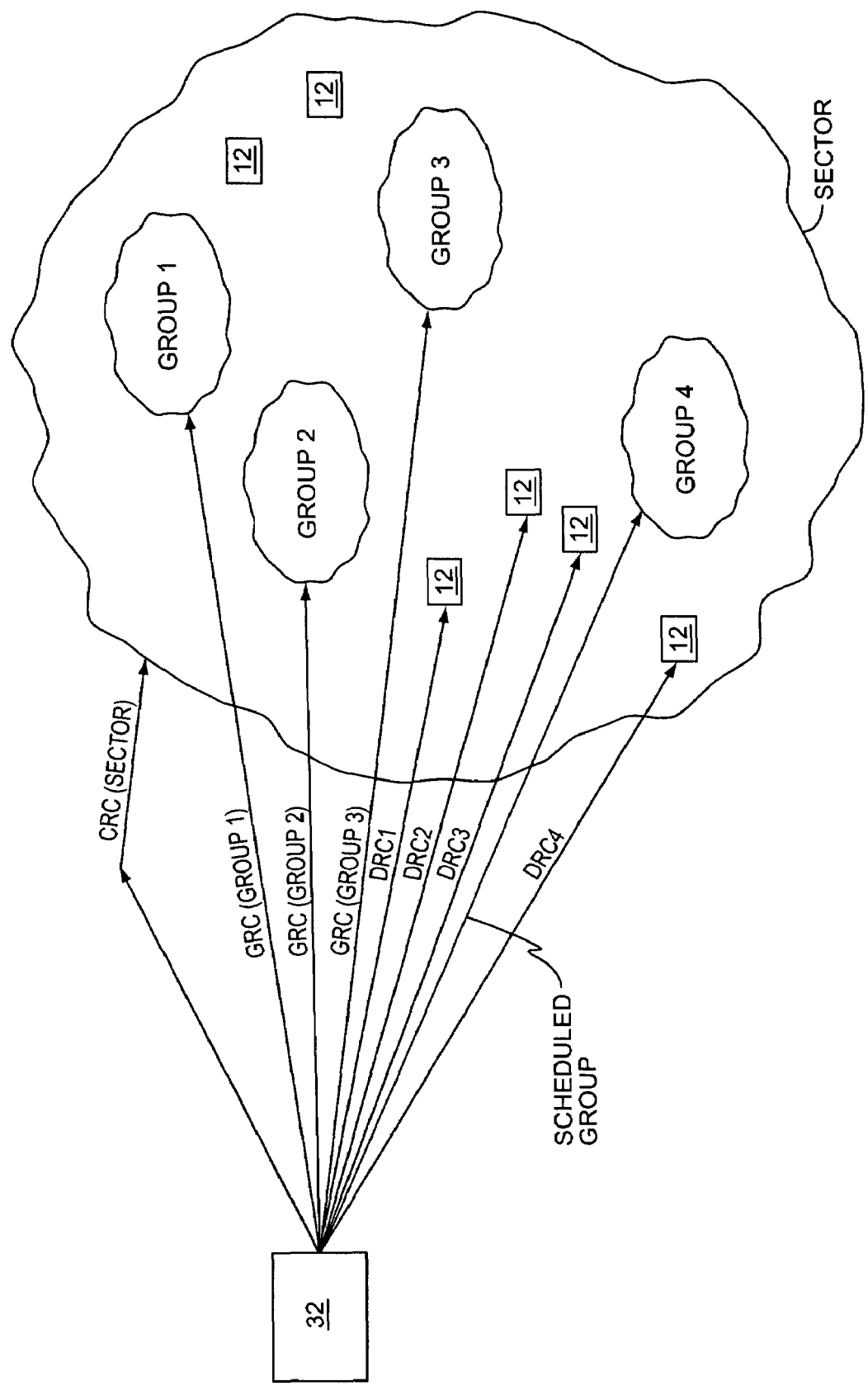
FIG. 5 is a diagram of an exemplary mixed control method using the generalized MAC of the present invention.

Of course, it should be appreciated that FIG. 4 illustrates only one possibility for providing multiple reverse link rate controls in MAC logic 50. FIG. 5 illustrates a more complex mixed rate control implementation wherein the MAC logic 50 of RBS 32 is configured to provide a plurality of different types of rate control commands to mobile stations 12 in a given sector of RBS 32. First, RBS 32 generates common rate control commands on a per sector basis. These common rate control commands generally may be used by any mobile station 12 in the sector, unless the mobile station 12 otherwise is assigned to another MAC rate controller 52.

Additionally, RBS 32 generates group-specific common rate control commands for each of three different groups of mobile stations 12, denoted as Groups 1, 2, and 3. RBS 32 also generates "scheduled" reverse link rate control commands for an additional group of mobile stations 12 denoted as Group 4. With scheduled rates, RBS 32 commands individual mobile stations 12 in Group 4 to operate at specific reverse link data rates for specific service intervals and thus can schedule which users transmit at what rates to effect one or more service objectives for the scheduled group of mobile stations 12, e.g., proportionally fair service, maximum throughput service, etc. Thus, one of the MAC logic's two or more rate controllers 52 can be configured as a scheduling rate controller that provides reverse link rate scheduling to the group of mobile stations 12 assigned to it. The commonly assigned and co-pending U.S. patent application entitled "REVERSE LINK SCHEDULER FOR CDMA NETWORKS" includes details for one or more methods of reverse link scheduling. That application, which is incorporated in its entirety herein by reference, was filed on 14 Nov. 2003 and is identified by Ser. No. 10/713,763.

With respect to the dedicated rate control commands generated by RC1, such commands may be generated as incremental adjustment commands, e.g., up by one rate, down by one rate, or hold current rate. In an exemplary cdma2000 embodiment, RC1 generates new rate control commands for MS1, MS2, and MS3 every reverse link frame, or at another appropriately frequent interval. The rate control commands generated by RC1 may be based on base station loading and/or on other criteria, such as QoS requirements of the service, and RC1 may send and receive information to and from the other rate controllers RC2 and RC3, and may adjust its rate control commands based at least in part on their operations.

For exemplary details regarding one method of per-user dedicated rate control that might be implemented by MAC logic 50 is described in the co-pending and commonly assigned U.S. patent application entitled, "PER USER RATE CONTROL FOR THE REVERSE LINK IN CDMA NETWORKS." That application, which is incorporated in its entirety herein by reference, was filed on 10 Dec. 2003 and is identified by Ser. No. 10/731,909.

Further, MAC logic 50 may generate dedicated per-user rate control commands, and other types of rate control commands based at least in part on feedback from the users, i.e., from the mobile terminals 12. For example, one or more of the mobile stations 12 may provide feedback indicating whether they desire reverse link rate increases, and/or whether they could increase their reverse link rates if so commanded. Examples of one type of such feedback appear in the co-pending and commonly assigned U.S. patent application entitled "REDUCED SIGNALING POWER HEADROOM FEEDBACK." That application, which is incorporated in its entirety herein by reference, was filed on 16 Dec. 2003 and is identified by Ser. No. 10/736,815.

Any mobile stations 12 in the sector that are not assigned to another rate controller 52, i.e., not in one of the groups and not assigned to dedicated rate control, may respond to the per-sector common rate control commands generated by RBS 32. Indeed, one or more of the mobile stations 12 may be configured to respond to multiple rate control commands of different types. For example, a given mobile station 12 may be configured to respond both to dedicated rate control commands and to common rate control commands. For example, the mobile station 12 may adjust or otherwise temper its response to incoming dedicated rate control commands based on the sector loading level indicated by the common rate control commands.

Conversely, the mobile station 12 might be configured such that the per-sector common rate control commands serve as its primary reverse link rate control commands but it also may respond to dedicated rate control commands from its serving sector. In another example, during soft handoff (SHO) of the mobile station 12, it may listen to the per-user dedicated rate control commands from its serving sector while also listening to the per-sector common rate control commands of one or more neighboring sectors. Thus, the mobile station 12 might ignore or otherwise adjust its response to incoming dedicated rate control commands from its serving sector based on the state of the common rate control commands being transmitted for the neighboring sectors. An exemplary mobile station 12 can be configured to carry out the above reverse link rate control behavior as a mechanism to limit/control the interference that it introduces to other sectors in soft handoff.

MAC logic 50 may be configured to provide rate control commands to a mobile station 12 on a "fundamental" rate control channel, and to provide supplemental rate control commands to it over a "supplemental" rate control channel. According to one embodiment, supplemental rate control commands supercede fundamental rate control commands. Thus, MAC logic 50 could override the rate control commands being sent by one rate controller 52 by sending rate control commands generated by another rate controller 52 to the mobile station 12 as supplemental rate control channel commands. Such operation can be useful, for example, in ensuring stable SHO operations and for control by a single (serving) sector when the mobile station 12 is in SHO. Exemplary mixes of fundamental and supplemental rate controls appear in Table 1 below.

TABLE 1

Exemplary Fundamental/Supplemental MAC Rate Control Mixes

| MAC Control | Allowable Fundamental MAC Control Mechanism | Allowable Supplemental MAC Control Mechanism |
| --- | --- | --- |
| Per-sector | X | X |
| Per-group | X | X |
| Per-user | X | X |

Of course, the present invention contemplates other fundamental/supplemental command behaviors besides the above described override approach. The contemplated behaviors include, but are not limited to, using supplemental commands to moderate the mobile station's response to the fundamental commands, responding to fundamental (primary) commands unless the supplemental (secondary) commands indicate a conflicting or special condition, using weighted averages of the primary and secondary commands to determine a "net" reverse link rate command at the mobile station, etc.

In addition to the per-user, per-group, per-sector, and scheduled rate controls offered in essentially any combination by MAC logic 50, it also may permit autonomous mobile station operation, wherein mobile stations 12 can be configured to have varying degrees of autonomous operation. Under autonomous operation, a given mobile station 12 can transmit on the reverse link at any rate up to a Maximum Allowable Autonomous Rate, e.g., 0 kbps, 9.6 kbps, 19.2 kbps, etc. Under autonomous operation, the mobile station 12 need not provide any feedback to RBS 32 if it is following per-user control commands. If the mobile station 12 is following per-sector or per-group commands, it may start its autonomous rate transmission when the sector or group commands indicate that such transmission is allowed.

The maximum autonomous rate can be negotiated for each mobile station 12 at call setup, and can be changed later if needed. Similarly, the particular rate controller 52 that a given mobile station 12 is assigned to can be determined at call setup as part of user admission processing. Such assignment and selection logic, which may comprise part of the earlier illustrated control logic 54, can be based on the needs of the particular mobile station 12, e.g., based on the type or nature of application(s) the mobile station 12 is running, and the logic can be implemented in RBS 32, in BSC 30, or in some combination of the two.

For example, a mobile station 12 running a web browsing application typically has asymmetrical forward and reverse link requirements in that it usually receives far more data than it sends. With such applications, reverse link rates usually are not critical and the mobile station 12 thus is a good candidate for common rate control. The use of common rate control is desirable from the network's perspective because of its relatively low processing and signaling overhead. Thus, the assignment of particular mobile stations 12 to particular ones of the two or more rate controllers 52 in the MAC logic 50 of RBS 32 may be decided at call setup based on the type or types of applications the mobile station 12 is running.

Further, the control logic 54, or other processing logic in RBS 32 or BSC 30, can be configured to provide dynamic rate controller assignment based on changing mobile station requirements. For example, reassignment of a mobile station 12 from one rate controller 52 to another, or the new association with an additional rate controller 52 with the mobile station 12 may be triggered by changing application requirements of the mobile station 12. As an example, a given mobile station 12 may be directed to follow per-sector common rate control commands upon its initial admission to network 10 but later directed to begin following dedicated rate control, group rate control, or scheduled rate control commands responsive to starting an application with higher QoS and/or data rates that cannot be met with common rate control.

Regardless of the particular mobile-to-controller assignments, RBS 32 may use any of one or more exemplary methods for sending rate control commands to the mobile stations 12. In one exemplary embodiment, the MAC logic 50 multiplexes rate control commands onto one or more other channels. That is, MAC logic 50 defines rate control "sub-channels" on one or more other channels by time multiplexing rate control information with other information being carried on the other channel(s).

Figure 6:
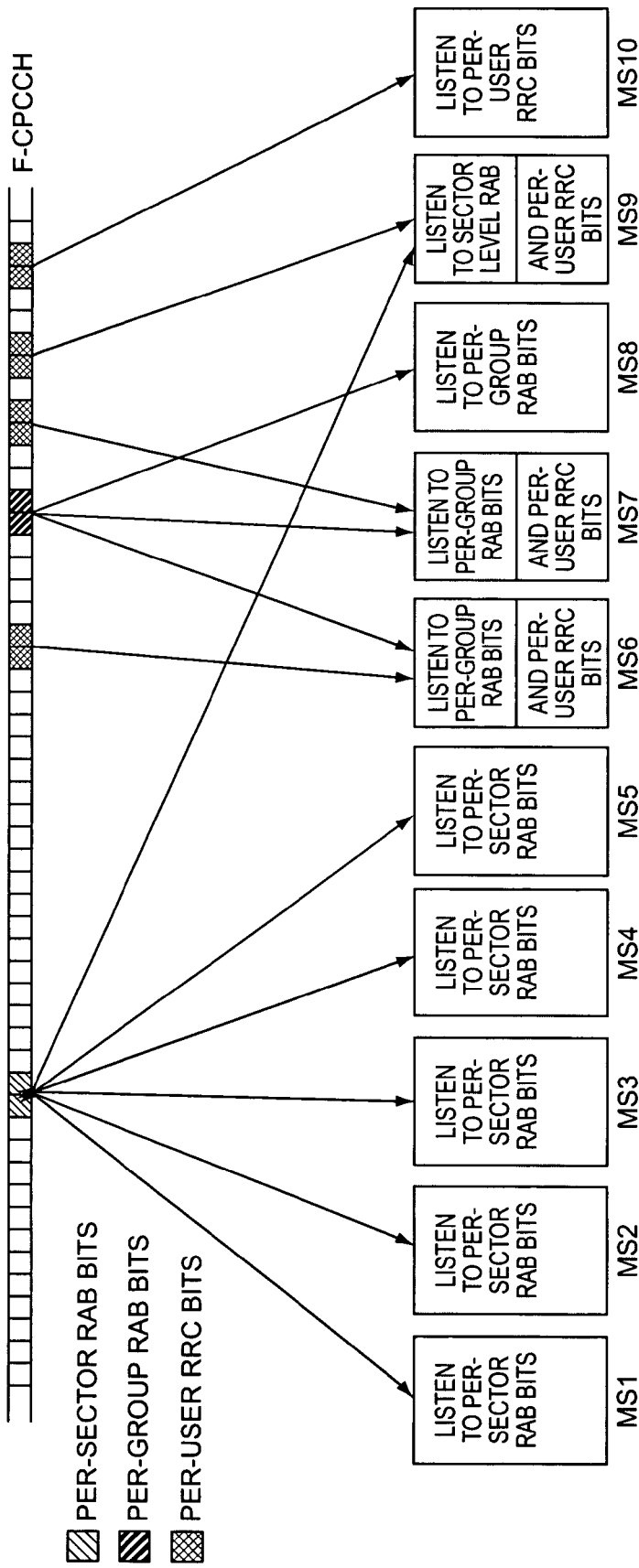
FIG. 6 is a diagram of exemplary sub-channel multiplexing methods to send mixed types of rate control commands to different mobile stations.

FIG. 6 illustrates sub-channel multiplexing of per-sector, per-group, and per-user rate control commands onto a forward link common power control channel (F-CPCCH). In cdma2000 systems, the F-CPCCH provides power control commands (Power Control Bits or PCBs) to mobile stations 12 at up to 800 Hz and the channel is arranged as a series of repeating blocks of sixteen Power Control Groups (PCGs), with each PCG providing index positions (slots) for up to twenty-four different mobile stations 12. FIG. 6 depicts one or more of those slots being used to send per-sector rate control commands to mobile stations MS1-MS5 and MS9, one or more of those slots being used to send per-group rate control commands to mobile stations MS6-MS8, and one or more slots being used to send per-user rate control commands to mobile stations MS6, MS7, MS9, and MS10.

Note that one or more of the illustrated mobile stations 12 respond to more than one type of rate control command, as was discussed in some detail earlier. For example, MS6 listens to per-user rate control commands and listens to per-group rate control commands for a defined group of mobile stations 12. Similarly, MS7 listens to its own per-user commands and listens to the same group commands as does MS6. MS8 listens exclusively to those same group commands. Meanwhile, MS9 listens both to its specific per-user rate control commands and per-sector rate control commands and MS10 listens only to the per-user rate control commands intended for it. Each mobile station 12 can be pointed to the appropriate index positions of the rate control sub-channels that will carry rate control commands as part of call setup, and later as part of dynamic rate control changes. It should be understood that other common channels can be used for multiplexing rate control information, and that the best or most convenient channel or channels used to carry rate control information to the mobile stations 12 may be different in different types of networks.

The particular rate control multiplexing details may be varied as needed, and it should be noted that dedicated rate control channels could be used if available. Indeed, essentially all of the above exemplary details may be varied as needed without departing from the present invention, which broadly provides two or more types of reverse link rate control in one or more sectors of an RBS 32. On that point, it should be noted that the exemplary RBS 32 may operate with one sector or two or more sectors, and further noted that one, some, or all of its sectors can provide mixed rate control and that different mixed rate controls can be used in different sectors of the same RBS. Thus, the present invention is not limited by the foregoing discussion, but rather is limited only by the following claims and their reasonable equivalents.

What is claimed is:

1. A wireless communication system including a Radio Base Station (RBS), said RBS comprising:

physical layer resources providing one or more wireless communication channels; and medium access control (MAC) logic to control allocation of the physical layer resources;

said MAC logic comprising two or more reverse link rate controllers, each rate controller configured to provide a different reverse fink rate control mechanism for a plurality of mobile stations associated with the rate controller;

wherein the two or more rate controllers comprise two or more of the following group of rate controllers: a per-sector rate controller configured to provide per-sector reverse link rate control commands, a per-user rate controller configured to provide per-user reverse link rate control commands, a per-group rate controller configured to provide per-group reverse link rate control commands, and a scheduling rate controller configured to provide scheduled reverse link rates to one or more mobile stations.

2. The system of claim 1, wherein the two or more rate controllers comprise a per-sector rate controller configured to generate per-sector reverse link rate control commands, and one or more of a per-group rate controller configured to generate per-group reverse link rate control commands, a per-user rate controller configured to generate per-user reverse link rate control commands, and a scheduling rate controller configured to generate scheduled reverse link rates for one or more mobile stations.

3. The system of claim 1, wherein the two or more rate controllers comprise a per-group rate controller configured to generate per-group reverse link rate control commands, and one or more of a per-sector rate controller configured to generate per-sector reverse link rate control commands, a per-user rate controller configured to generate per-mobile reverse link rate control commands, and a scheduling rate controller configured to generate scheduled reverse link rates for one or more mobile stations.

4. The system of claim 1, wherein the two or more rate controllers comprise a per-user rate controller configured to generate per-user reverse link rate control commands, and one or more of a per-sector rate controller configured to generate per-sector reverse link rate control commands, a per-group rate controller configured to generate per-group reverse link rate control commands, and a scheduling rate controller configured to generate scheduled reverse link rates for one or more mobile stations.

5. The system of claim 1, wherein the two or more rate controllers comprise three rate controllers including a per-sector rate controller, a per-group rate controller, and a per-user rate controller, and wherein the MAC logic is configured to run the three rate controllers simultaneously to provide three different rate control mechanisms for different mobile stations or groups of mobile stations being supported by the RBS.

6. The system of claim 1, wherein the MAC logic is configured to multiplex rate control commands from at least one of the two or more rate controllers onto a common power control channel.

7. The system of claim 1, wherein the physical layer resources are configured to provide one or more sub-channels on a common power control channel, and wherein the MAC logic is configured to send rate control commands from the two or more rate controllers on the one or more sub-channels.

8. The system of claim 1, wherein the system further comprises base station control logic configured to selectively assign each mobile station to one or more of the rate controllers.

9. The system of claim 8, wherein the base station control logic is configured to assign a given mobile station to two of the two or more rate controllers, such that the mobile station receives rate control commands from two different rate controllers in the MAC logic.

10. The system of claim 9, wherein a first one of the two rate controllers comprises one of a per-sector rate controller, a per-group rate controller, and a per-user rate controller, and wherein a second one of the two rate controllers comprises one of a per-group rate controller, a per-sector rate controller, and a per-user rate controller.

11. The system of claim 8, wherein the base station control logic is configured to assign individual mobile stations to one or more of the rate controllers based on an application type of the mobile stations.

12. The system of claim 8, wherein the base station control logic is configured to change which rate controllers a given mobile station is assigned to during ongoing service based on changing application types of the mobile station.

13. The system of claim 8, wherein the system further comprises a Base Station Controller (BSC) including the base station control logic.

14. The system of claim 8, wherein the base station control logic is configured to assign mobile stations to one or more of the rate controllers at call setup times.

15. A method of reverse link control at a wireless communication network base station system, the method comprising:
providing two or more reverse link rate controllers, each rate controller configured to generate reverse link rate control commands distinct from the commands generated by the other rate controllers;
selectively associating a plurality of individual mobile stations with at least one of the rate controllers; and
generating reverse link rate control commands using one or more of the rate controllers and transmitting the commands to associated mobile stations;
wherein providing two or more reverse link rate controllers comprises, for a given radio sector of the base station system, providing at least two rate controllers selected from the group comprising a per-sector rate controller, a per-group rate controller, a per-user dedicated rate controller, and a scheduling rate controller.

16. The method of claim 15, wherein providing two or more rate controllers comprises providing control logic to implement two or more rate controllers in each radio sector of a radio base station included in the base station system.

17. The method of claim 16, wherein providing control logic to implement two or more rate controllers in each radio sector of a radio base station included in the base station system comprises providing Medium Access Control (MAC) logic in the radio base station, wherein the MAC logic is configured functionally to implement two or more rate controllers in each radio sector of the radio base station.

18. The method of claim 16, wherein providing control logic to implement two or more rate controllers in each radio sector of a radio base station included in the base station system comprises providing base station control logic in a base station controller included in the base station system, wherein the base station control logic is configured functionally to implement two or more rate controllers in each radio sector of the radio base station.

19. The method of claim 15, wherein selectively associating a plurality of individual mobile stations with at least one of the rate controllers comprises determining rate controller associations for the individual mobile stations at call admission based on one or more service requirements of the individual mobile stations.

20. The method of claim 19, wherein selectively associating a plurality individual mobile stations with at least one of the rate controllers further comprises dynamically changing the rate controller associations of individual mobile stations after call admission based on changing service requirements of the individual mobile stations.

21. The method of claim 19, wherein selectively associating a plurality of individual mobile stations with at least one of the rate controllers further comprises controlling reverse link congestion by dynamically changing the rate controller associations of individual mobile stations after call admission based on changing service requirements of the individual mobile stations.

22. The method of claim 5, wherein selectively associating a plurality of individual mobile stations with at least one of the rate controllers comprises associating at least one mobile station with a first one of the rate controllers to act as a fundamental rate controller for the mobile station, and with a second one of the rate controllers to act as a supplemental rate controller for the mobile station, such that reverse link rate control for the mobile station is effected based on a desired combining relationship of the rate control commands transmitted by the fundamental and supplemental rate controllers.

23. The method of claim 15, wherein providing two or more reverse link rate controllers comprises, for a given radio sector of the base station system, providing at least one per-group rate controller to generate common rate control commands for a group of associated mobile stations, and providing at least one other rate controller comprising a per-sector rate controller to generate common rate control commands for the radio sector, a per-user rate controller to generate dedicated rate control commands for associated mobile stations, or a scheduling rate controller to generate scheduled rate control commands for associated mobile stations.

24. The method of claim 15, wherein providing two or more reverse link rate controllers comprises, for a given radio sector of the base station system, providing at least one per-sector rate controller to generate common rate control commands for associated mobile stations, and providing at least one other rate controller comprising a per-group rate controller to generate common rate control commands for associated mobile stations, a per-user rate controller to generate dedicated rate control commands for associated mobile stations, or a scheduling rate controller to generate scheduled rate control commands for associated mobile stations.

25. The method of claim 15, wherein providing two or more reverse link rate controllers comprises, for a given radio sector of the base station system, providing at least one per-user rate controller to generate dedicated rate control commands for associated mobile stations, and providing at least one other rate controller comprising a per-sector rate controller to generate common rate control commands for associated mobile stations, a per-group rate controller to generate common rate control commands for associated mobile stations, or a scheduling rate controller to generate scheduled rate control commands for associated mobile stations.

* * * * *

UNITED STATES PATENT AND TRADEMARK OFFICE
CERTIFICATE OF CORRECTION

PATENT NO. : 7,406,077 B2  Page 1 of 1
APPLICATION NO. : 10/755104
DATED : July 29, 2008
INVENTOR(S) : Balasubramanian et al.

It is certified that error appears in the above-identified patent and that said Letters Patent is hereby corrected as shown below:

In Column 10, Line 8, delete "th e" and insert -- the --, therefor.

In Column 12, Line 58, in Claim 1, delete "fink" and insert -- link --, therefor.

In Column 14, Line 65, in Claim 22, delete "5," and insert -- 15, --, therefor.

Signed and Sealed this

Twenty-eighth Day of April, 2009

JOHN DOLL
*Acting Director of the United States Patent and Trademark Office*